Patented Jan. 27, 1931

1,789,983

UNITED STATES PATENT OFFICE

DAVID MILLAR, OF ST. LOUIS, MISSOURI

PROCESS FOR COOKING CANDY

No Drawing.   Application filed March 10, 1930. Serial No. 434,822.

My invention has relation to improvements in processes of making candy and it consists in the novel features more fully set forth in the specification and pointed out in the claims.

According to the present practise in the making of plain candies from sugar, the sugar is boiled with water until sufficient moisture has been expelled from the mass to allow the sugar sirup to harden on cooling. This is a rather slow process involving the expenditure of considerable heat before the batch has been sufficiently dehydrated to convert the sugar into candy.

I have discovered that the saccharine substance, whether it be saccharose, glucose, or dextrose, may be heated in oil (either a vegetable or a mineral oil) and brought to a melting temperature in the oil, after which the oil may be decanted and the fused sugar allowed to harden into candy. Preferably, an edible oil would be used in this process, such as olive oil, corn oil or cotton seed oil, so that an unsavory flavor would not be imparted to the candy should a portion of the oil be occluded therein.

The process will best be understood by giving a specific recipe:

In the making of ordinary taffy candy, ten pounds of glucose is mixed into one gallon of oil (petrolatum) which may be heated prior to the mixing, or afterwards, to a temperature of approximately 260° F. This temperature is continued for a sufficient length of time to fuse the glucose which then settles to the bottom of the container holding the mixture. The oil is now decanted after which the viscid glucose is poured onto a cooling slab for subsequent treatment, for example, pulling. If the candy is to be used for coating popcorn or the making of a similar confection, it is applied to the coating of the popcorn while in a liquid or semi-liquid condition.

I have found that candy made according to my improved method contains practically no moisture and is not as readily affected by the moisture in the atmosphere as candy worked with water. As a matter of fact, moisture does not affect it to the extent of making the candy sticky or gummy. Candy made according to my process therefore, has the advantage of being more easily and tidily handled while being eaten. In the claims, the term saccharine substance means any substance that is commonly called sugar, and includes any of the sugars whether they be saccharose, glucose, or dextrose; and the term oil includes any oil that does not contain substances harmful to the human system whether they are classed as edible oils or not.

Having described my invention, I claim:

1. The process of making candy which comprises mixing a batch of saccharine substance with oil, heating the mixture until the saccharine substance is melted, separating the oil and melted saccharine and allowing the melted sugar to cool and harden.

2. The process of making candy which comprises mixing a batch of dextrose with a harmless oil, heating the mixture to a temperature sufficient to fuse the sugar, separating the fused sugar from the hot oil, and allowing the sugar to cool and harden.

3. The process of making candy which comprises mixing a batch of dehydrated dextrose with an edible oil, heating the mixture to a temperature sufficient to melt the dextrose, separating the melted dextrose from the oil and recovering the dextrose.

4. The process of making candy which comprises mixing a batch of saccharine substance with an edible oil heating the mixture to approximately 260° F., decanting the oil and recovering the saccharine substance in melted condition.

In testimony whereof I hereunto affix my signature.

DAVID MILLAR.